United States Patent
Shiraki et al.

[15] 3,666,147
[45] May 30, 1972

[54] APPARATUS FOR FEEDING VISCOUS MATERIALS

[72] Inventors: Takashi Shiraki, Neyagawa; Izumi Hino, Moriguchi, both of Japan

[73] Assignee: Matsushita Electric Industrial Co., Ltd., Osaka, Japan

[22] Filed: Sept. 8, 1970

[21] Appl. No.: 70,159

[30] Foreign Application Priority Data

Sept. 19, 1969 Japan...................................44/76079
Sept. 19, 1969 Japan...................................44/76080
Sept. 19, 1969 Japan...................................44/76081

[52] U.S. Cl..............................222/309, 141/158, 222/440
[51] Int. Cl........................................................G01f 11/06
[58] Field of Search................222/233, 235, 309, 333, 409, 222/440, 168.5, 375, 453; 141/158; 137/625.28, 625.69

[56] References Cited

UNITED STATES PATENTS 3,580,302   5/1971   Riesnberg......................222/168.5 X
3,179,302   4/1965   Murray..................................222/233
2,979,080   4/1961   Hewitt..........................137/625.69 X
1,254,190   1/1918   Baker..............................141/158 X Primary Examiner—Samuel F. Coleman
Assistant Examiner—Larry Martin
Attorney—Stevens, Davis, Miller & Mosher

[57] ABSTRACT

An apparatus for feeding viscous materials, in which a material, e.g. a gel, having a relatively high viscosity is stored in a storage tank with stirring means disposed therein, and feeder means consisting of two piston-cylinder units combined integrally in a cross-shape is connected to the storage tank in communication therewith, said two pistons being slidingly operated within the respective cylinders by driving means, whereby the gel in the storage tank is sucked into one of the cylinders and discharged from one end of the other cylinder.

4 Claims, 4 Drawing Figures

APPARATUS FOR FEEDING VISCOUS MATERIALS

The present invention relates to an apparatus for feeding viscous materials, which is capable of feeding a predetermined quantity of a material having a relatively high viscosity, e.g. a gel, grease or a material having substantially the same viscosity, in a highly efficient manner. More specifically, the invention relates to an excellent apparatus which can be used, for example, in feeding a predetermined quantity of gel-like electrolyte, called solid electrolyte, or a gel-like electrode consisting of a mixture of said gel-like electrolyte and an active material, used in a battery, into a battery container in an efficient manner.

Gel-like electrodes, particularly those which are used in alkaline batteries, comprise a sodium salt of methyl cellulose or carboxy-methyl cellulose, or a natural starch dissolved in caustic potash solution as a thickener. The gel-like electrode is prepared by mixing an active material, e.g. amalgamated zinc powder, into a gel containing a caustic potash solution whose viscosity has been sufficiently increased with the starch or cellulose derivative mentioned above.

When the gel-like electrolyte or the gel-like electrode obtained by mixing an active material into the gel-like electrolyte is left to stand still after the formulation thereof, uneven distribution of the component will occur. This is because, in case of the gel-like electrolyte, the molecular structure of the starch or cellulose derivative is destroyed by caustic potash and the viscosity of the electrolyte is lost, and in case of the gel-like electrode, the active material agglomerates in the lower portion before the viscosity of the gel-like electrolyte is lowered, due to the weight difference between said electrolyte and said active material, and thus the electrolyte and the active material are separated.

The viscosity lowering and uneven distribution of components of the gel-like electrolyte or gel-like electrode, are also caused by the influence of temperature. This is because the viscosity is lowered as the temperature rises, as can be seen in any and all viscous materials. It is, therefore, important and essential, for avoiding viscosity lowering and uneven component distribution of a viscous material, to maintain the viscous material at a low temperature and to agitate the viscous material after formulation of the same.

The viscous materials used in a battery, i.e. the aforesaid gel-like electrolyte and gel-like electrode, must be handled carefully by reason of the viscosities and the strong alkaline properties thereof and, for this reason, complete satisfaction has not been obtained as yet in feeding and charging a predetermined quantity of the gel-like electrolyte or gel-like electrode in a large quantity of battery containers accurately at high efficiency.

An object of the present invention is, in an apparatus for feeding a viscous material, to prevent a viscosity lowering and uneven component distribution of the viscous material and thereby to maintain the viscous material homogenous, by providing stirring means in a storage tank in which said viscous material is stored.

Another object of the invention is to feed a predetermined quantity of a viscous material in a highly efficient manner by feeder means which consists of two piston-cylinder units integrally combined in a cross-shape and is connected to the storage tank in communication therewith.

Still another object of the invention is to eliminate an error in the quantity of the viscous material to be fed, by preventing the viscous material in the storage tank from dripping upon completion of one cycle of feeding operation, by the unique operation of the feeder means consisting of the piston-cylinder units.

Still another object of the invention is to make the operation of the entire feeding apparatus simple by controlling driving means thereof by an electrical control circuit which is operated by the piston rods of the feeder means.

Other objects, features and advantages of the present invention will become apparent from the following detailed description taken in conjunction with the accompanying drawings, in which.

Figure 2:
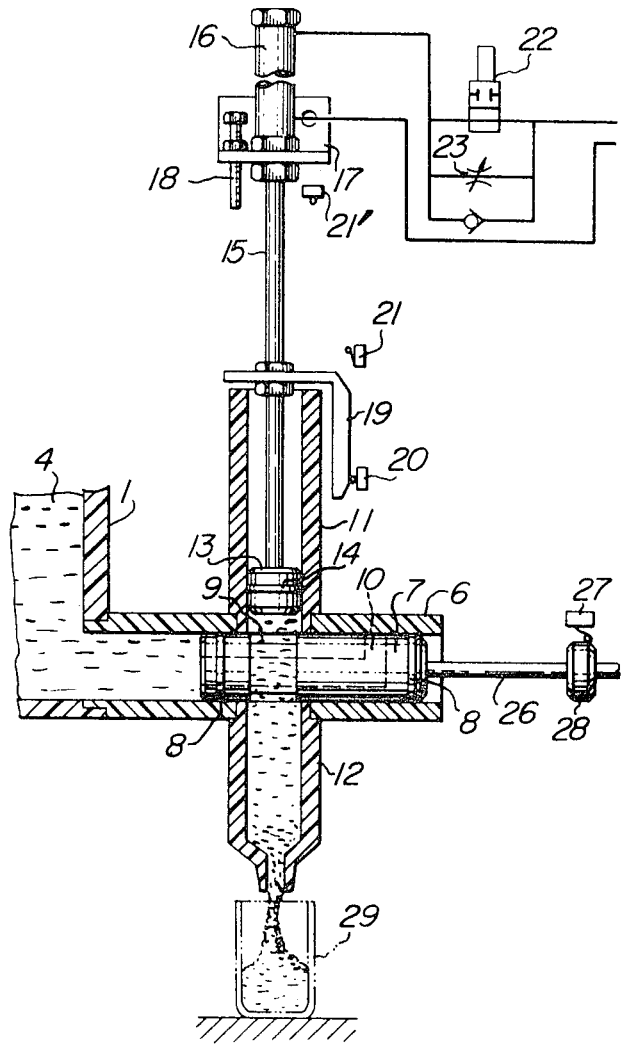
FIG. 2 is a cross-sectional view illustrating the operation of the feeder means in feeding a viscous material, injected into the cylinder, into a battery container.
Figure 3:
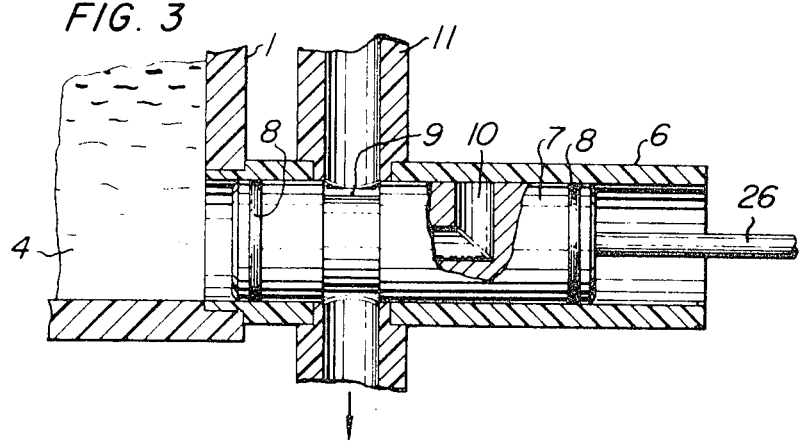
FIG. 3 is a cross-sectional view showing the relative position of the piston and the cylinder of one of the piston-cylinder units during the viscous material feeding operation shown in FIG. 2.

First of all, the embodiment of the invention shown in FIGS. 1, 2 and 3 will be described with reference to the case in which the apparatus is used for feeding and charging the gel-like electrode mentioned above, into a battery container.

In the drawings, reference numeral 1 designates a storage tank for the gel-like electrode, which is made of an alkali-resistant or acid-resistant material, e.g. hard polyvinyl chloride resin, and in which is provided a stirring impeller 3 having three stirring vanes 2 and made of the same hard polyvinyl chloride. The gel-like electrode 4 (hereinafter referred to simply as gel) stored in the storage tank 1 is stirred by the impeller 3 and maintained in a stable state, so as to avoid local concentration of the components thereof. The gel 4 is composed of caustic potash, and amalgamated zinc powder and a thickener which are dissolved in said caustic potash in the proportion of 3 : 1, and has a viscosity of 300 poises. A preferable viscosity of the gel is from 150 – 300 poises. The impeller 3 is driven from a motor 5 mounted on one side wall of the storage tank 1.

To the front lower portion of the gel storage tank 1 is connected a horizontally extending cylinder 6 constituting a part of feeder means by which the gel is directly fed. The cylinder is preferably made of such a material which is sufficiently resistive to alkali as well as acid and also resistive to wear in engagement with a piston slidably disposed therein. In the embodiment shown, the cylinder 6 is molded of a ceramic.

The piston 7 axially slidably disposed in the cylinder 6 is made of Teflon and has piston rings 8 mounted on the opposite end portions thereof to maintain fluidtight sealing between it and the cylinder 6. An annular groove 9 is formed at substantially the center of the piston 7 around the entire circumference thereof to provide a gel passageway, the width of said annular groove 9 being equal to the diameter of an injection cylinder to be described later. Further, an L-shaped gel passage channel 10 is formed in the piston 7, with one end thereof open in the forward end of the piston for communication with the interior of the storage tank 1 and the other end open in the peripheral surface thereof for communication with the interior of the injection cylinder to be described later.

The piston 7 is also preferably made of a material, e.g. Teflon or Delrin (polyacetal resin), which is not susceptible to corrosion by the alkali or acid contained in the gel and will not be worn by the sliding movement within the cylinder.

Reference numeral 11 designates a gel injection cylinder extending perpendicular to the cylinder 6 in crossing relation and 12 designates a gel charging nozzle fixedly connected to and extending downwardly from the cylinder 6 from a point immediately below the injection cylinder 11.

Similar to the cylinder 6, a piston 13 is slidably disposed in the cylinder 11 for extruding the gel and a piston ring 14 is mounted on the peripheral surface of said piston 13. The piston 13 is not formed therein with an L-shaped gel passage channel as is in the piston 7, and it serves to discharge the gel from the cylinder 11 by the lower end surface thereof.

Reference numeral 15 designates a piston rod connected at its lower end to the piston 13 to cause a vertical sliding movement of said piston, the upper end of said piston rod 15 being connected to a piston in an air cylinder 16. The piston rod 15 is moved up and down over a stroke of about 100 mm by the operation of the air cylinder 16. Reference numeral 17 designates a bracket on which the air cylinder 16 is fixedly mounted. In addition to the air cylinder 16, a bolt 18 is also provided on the bracket 17 to limit the upper end of the stroke of the piston rod 15.

The piston rod 15 has an L-shaped plate cam 19 fixed thereon. In the lifted position of the piston rod 15, the plate cam 19 engages a microswitch 21', provided at the level of the lower end of the bolt 18, to actuate the same. The cam plate 19 also operates microswitches 20 and 21 which control the air cylinder 16 indirectly. Reference numeral 22' designates a change-over valve for switching air supply to the air cylinder 16 and 23 designates a speed controller for controlling the return speed of the air cylinder 16, all of which are operated electrically.

On the other hand, the piston 7 in the cylinder 6 is also connected to the forward end of a piston rod 26 of an air cylinder 25 which is mounted on a bracket 24 in opposed relation to the rear open end of the cylinder 6. Thus, the piston 7 is slidably horizontally moved within the cylinder 6 by the piston rod 26 when the air cylinder 25 is actuated.

The piston rod 26 is likewise provided thereon with a cam 28 for operating a microswitch 27 which actuates the aforesaid air cylinder 16, and operatively connected to a change-over valve 22''. Reference numeral 29 designates a container of a battery disposed immediately below the charging nozzle 12, and 30 designates a foot switch for operating the apparatus.

Figure 1:
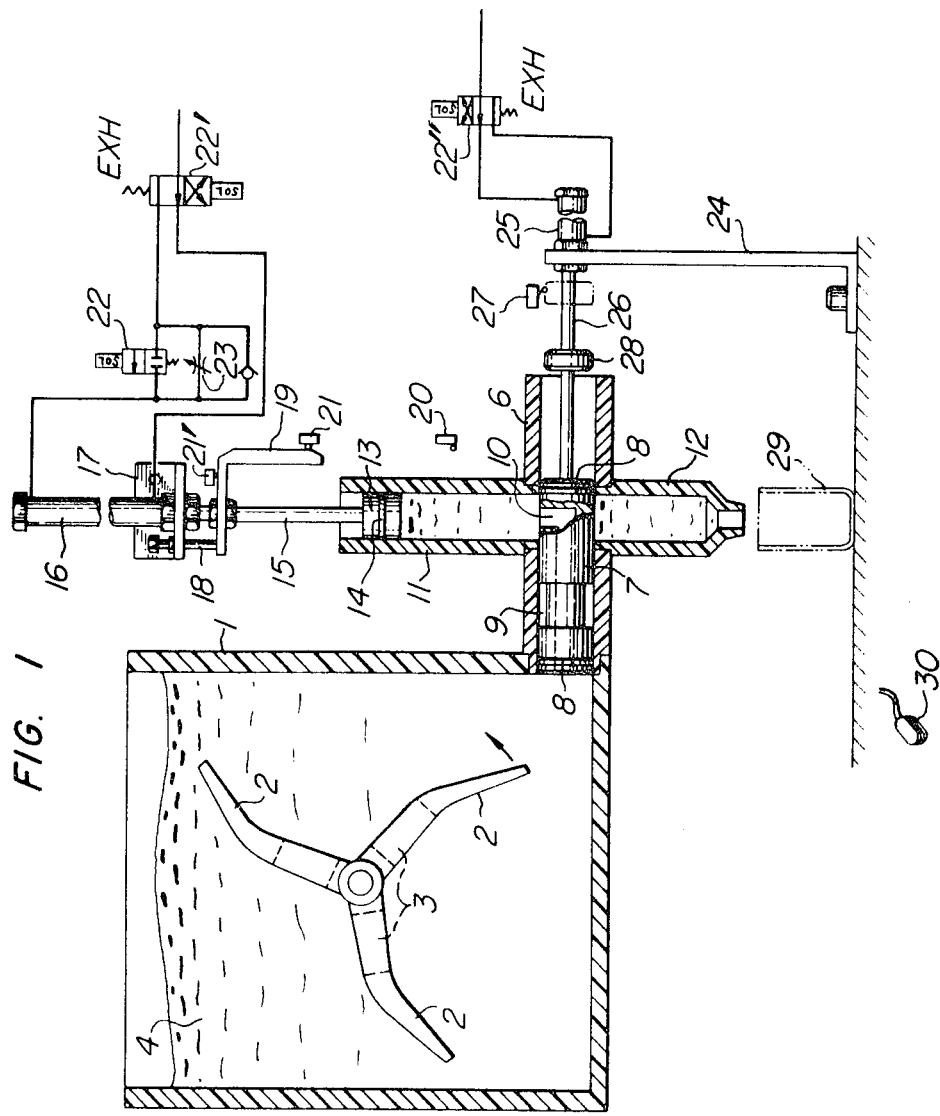
FIG. 1 is a vertical cross-sectional view showing an embodiment of the apparatus for feeding viscous materials according to the present invention.

The apparatus shown in FIG. 1 is in a position immediately before the gel is charged in the container 29. When a power circuit is closed in this position of the apparatus by actuating the foot switch 30, the changeover valve 22'' is actuated at first to operate the air cylinder 25. The piston rod 26 is retracted into the cylinder 25 and the piston 7 is slidingly moved from the left to right within the cylinder 6, to the position shown in FIG. 3. Incident to the movement of piston rod 26, the microswitch 27 is actuated by the cam 28, so that the other air cylinder 16 is actuated and the piston rod 15 is plunged. Therefore, the piston 13 connected to the piston rod 15 is slidingly moved downwardly within the cylinder 11 and the gel filled in said cylinder 11 is forced into the nozzle 12 through the groove-shaped annular passageway 9 formed in the piston 7. Consequently, an amount of gel equal to the amount of gel forced into the nozzle 12 is charged into the container 29 through said nozzle 12.

Incident to the downward movement of the piston rod 15, the microswitch 20 is actuated by the plate cam 19 carried on said piston rod 15, whereupon the changeover valves 22, 22' for the air cylinder 16 are actuated to switch the air supply direction. The air cylinder 16 is operated in a reverse way and the piston rod 15 is lifted from its lowered position by the operation of said air cylinder.

The piston 13 is quickly moved upwardly within the cylinder 11, with the result that a negative pressure approximating vacuum state appears within the cylinder 11. Therefore, excess gel which is present in the vicinity of the discharge port of the nozzle 12 and about to drop from the nozzle is withdrawn into the nozzle 12, whereby the so-called dripping condition can be avoided.

The plate cam 19 is also moved upward incident to the upward movement of the piston rod 15. When the microswitch 21 is actuated by the plate cam 19, the valve 22 is closed and the upward movement of the piston rod 15 is controlled by the speed controller 23. The speed of the upwardly moving piston rod 15 is reduced. The upward movement of the piston rod 15 is stopped at the point when the plate cam 19 abuts against the microswitch 21' positioned on the same level as the lower end of the set bolt 18. When the microswitch 21' is thus actuated, the air cylinder 25 is actuated and the rod 26 is plunged, causing the piston 7 to move from the right to left within the cylinder 6, to the original position shown in FIG. 1. As a result, the L-shaped gel passage channel 10 in the piston 7 establishes communication between the interior of the storage tank 1 and the interior of the cylinder 11 therethrough, and the gel 4 in the storage tank 1 is drawn into the cylinder 11 by the effect of the negative pressure in said cylinder. Thus, the apparatus resumes the condition shown in FIG. 1.

By this step, one cycle of the charging operation from the step of withdrawing the gel into the cylinder 11 to the step of charging the gel into the container 29 through the nozzle 12, is completed. Since the stroke of the piston 13 is defined by the top dead center which is determined by the position of the microswitch 21' and the bottom dead center where the microswitch 20 is actuated by the cam 19 to reverse the operation of the cylinder 16, it will not be changed even if the piston 13 is frequently reciprocated, and hence the quantity of the gel withdrawn into the cylinder 11 from the storage tank 1 through the L-shaped gel passage channel 10 is always constant. Accordingly, the quantity of the gel forced into the nozzle 12 is always constant and the quantity of the gel charged into the container 29 through the nozzle 12 is also constant.

The present inventors measured the quantity of gel fed by the apparatus on each one of three different types of the inner diameter of the gel injection cylinder and the stroke of the piston, the results of which are shown below:

| Type | Inner Diameter of Cylinder (mm) | Stroke of Piston (mm) | Weight of Gel Fed (g) |
| --- | --- | --- | --- |
| I | 18 | 72.6 | 43 |
| II | 12 | 70.3 | 18.5 |
| III | 6 | 86.5 | 5.7 |

In all types, the quantity of gel fed is equal to or tends to be slight larger than a set value. This is because the gel remaining on the nozzle from the preceding cycle of feeding operation is charged into the container together with the gel charged in the following cycle.

Figure 4:
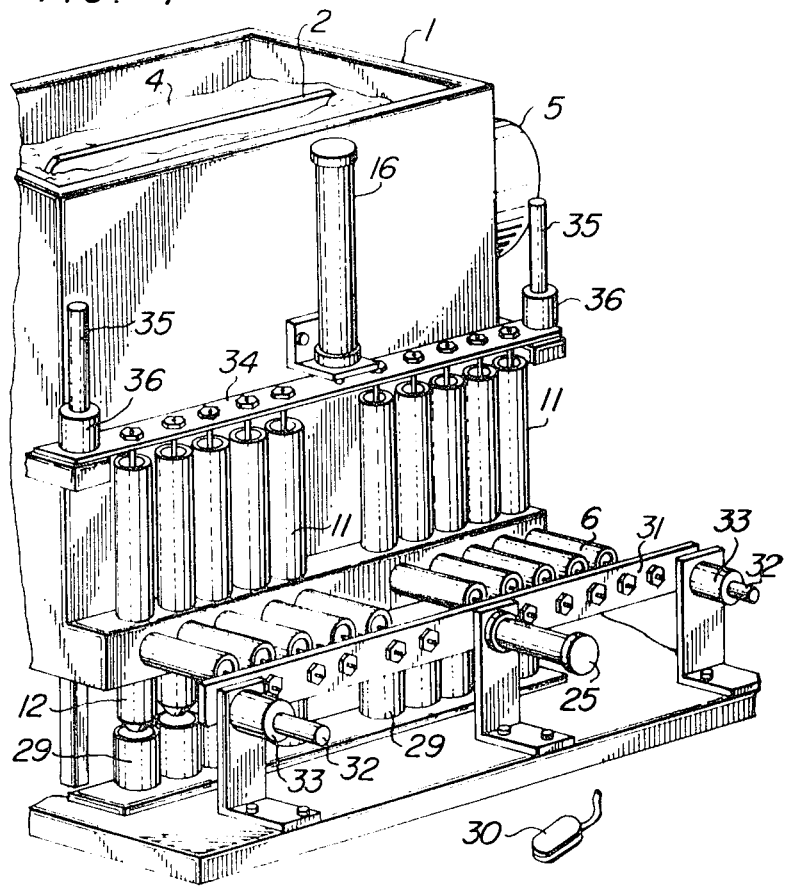
FIG. 4 is a fragmentary perspective view of another embodiment of the invention which comprises a large number of the feeder means of the type shown in FIGS. 1, 2 and 3.

In order to charge a predetermined quantity of gel in each one of a large number of containers concurrently, a large number of the cylinders 6, 11 are arranged side by side in the manner shown in FIG. 4. In the arrangement shown in FIG. 4, a plurality of the gel feeding cylinders 6 and the gel injection cylinders 11 are arranged side by side and the rods connected to the pistons in ones of said cylinders, e.g. the rods connected to the pistons 7, are secured to a rod connecting plate 31 which in turn is connected to the piston rod of the air cylinder 25. By operating the rod connecting plate 31 by the air cylinder 25, the pistons 7 in the respective gel feeding cylinders 6 are operated all at one. In this case, it is preferable that the operating force of the rod connecting plate 31 is uniformly distributed to the pistons of the respective cylinders and the rod connecting plate is operated with a minimum frictional resistance. To this end, sliding guide rods 32 are provided at the opposite ends of the rod connecting plate 31 and are slidably supported by sleeves 33 respectively to ensure smooth movement of said rod connecting plate.

Likewise, the piston rods of the gel injection cylinders 11 are secured to a rod connecting plate 34 and said rod connecting plate 34 is connected to the piston rod of the air cylinder 16. The rod connecting plate 34 is similarly provided with sliding guide rods 35 at the opposite ends thereof, which are supported by sleeves 36 for sliding movement therethrough.

By arranging a large number of the gel injection cylinders in side-by-side relation and charging a predetermined quantity of gel in each of a large number of containers all at once as described above, the time required for the charging operation can be drastically shortened and yet further the charging operation can be automatized by electrically controlling the operation of the apparatus, with the result that the number of attendants can be decreased and in addition the dangerous condition and the aggravation of working environment, otherwise caused by the gel attaching to the attendants, can be eliminated.

Although the apparatus of the invention has been described herein as used with the so-called gel-like negative electrode which consists of a mixture of a gel-like electrolyte and zinc powder, it can similarly be used for charging into a container a predetermined quantity of a gel-like electrolyte, called solid electrolyte, grease or viscous material of a character close to gel.

The claimed apparatus for feeding viscous materials has the advantage that a desired quantity of a viscous material can be fed in a highly efficient manner and particularly has such an excellent advantage that the economy and efficiency of the operation of charging a gel-like electrolyte or a gel-like electrode into a battery container can be enhanced in the battery industry.

In the present invention, where a viscous material to be handled is a gel-like electrode or a gel-like electrolyte as mentioned above, the component parts which are contacted by such material can all be made of a material which will not be corroded by the material. It should also be understood that many changes and modification can be made to the details of the embodiment described and illustrated herein, without deviating from the spirit of the invention.

What is claimed is:

1. An apparatus for feeding a fluid material, comprising:

a storage container for a fluid material, stirring means in said container including vanes rotatable about a horizontal axis whereby said vanes effect a vertical intermixing of any fluid materials in said container;

a feeder means connected to said container for discharging a predetermined volume of fluid material from said container in the form of successive slugs, said feeder means comprising a first cylinder and a second cylinder arranged transversely of each other whereby their respective bores transversely intersect each other, said first cylinder communicating with said container, and a first piston and a second piston slidably mounted and tightly sealed in said first and second cylinders, respectively, for reciprocating in said cylinders, and said first piston being of a length such that it always bridges the intersection of said cylinders, a portion of the first piston further from the container being of a diameter whereby it effectively seals off from said first cylinder the portions of said second cylinder which are on opposite sides of said intersection, a portion of said first piston nearer the container being radially recessed along an axial length substantially equal to the diameter of said second cylinder bore, an internal channel in said first piston extending axially from the end of said first piston facing the container to a point on the other side of the aforementioned radial recess, said channel emerging radially for communicating with said second cylinder, and said second piston adapted to reciprocate without passing through the intersection between said cylinders;

drive means for driving said pistons in accordance with a predetermined pattern of movement, wherein said second piston is adapted to move toward the end of its stroke which is remote from the intersection of said cylinders when said first piston is at the end of its stroke where it is nearer said container, and said internal channel forms a passageway from said container to said second cylinder; and said second piston is adapted to move toward the other end of its stroke toward said intersection when said first piston is at the end of its stroke further from said container with the radially recessed portion thereof being aligned with said second cylinder, whereby fluid material may flow through said second cylinder past said intersection in response to the movement of said second piston toward said intersection.

2. The apparatus of claim 1, wherein the parts of said apparatus designed to contact the fluid material to be pumped comprise an acid-resistant and alkali resistant material.

3. The apparatus of claim 1, including a plurality of said feeder means connected to a container, each of which feeder means comprises said first and second cylinders and said first and second pistons, said feeder means arranged to feed material simultaneously at a plurality of different locations from said container, the plurality of first pistons all being interconnected with each other, and the plurality of said second pistons all being interconnected with each other, wherein all of said feeder means are operable in unison.

4. The apparatus of claim 1, wherein the second piston tightly fitted within said second cylinder is for inducing a substantial vacuum within said second cylinder during its movement away from said intersection.

* * * * *